(12) United States Patent
Gupta et al.

(10) Patent No.: US 10,367,787 B2
(45) Date of Patent: Jul. 30, 2019

(54) INTELLIGENT FIREWALL ACCESS RULES

(71) Applicant: MCAFEE, LLC, Santa Clara, CA (US)

(72) Inventors: Bikram Kumar Gupta, Sunnyvale, CA (US); Ananth Raman, San Jose, CA (US); Manuel Nedbal, Santa Clara, CA (US); Elanthiraiyan A. Anbalagan, Sunnyvale, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/038,388

(22) PCT Filed: Dec. 20, 2013

(86) PCT No.: PCT/US2013/077233
§ 371 (c)(1),
(2) Date: May 20, 2016

(87) PCT Pub. No.: WO2015/094372
PCT Pub. Date: Jun. 25, 2015

(65) Prior Publication Data
US 2016/0315911 A1  Oct. 27, 2016

(51) Int. Cl.
*H04L 29/06* (2006.01)
*G06F 16/28* (2019.01)
(Continued)

(52) U.S. Cl.
CPC ........ *H04L 63/0263* (2013.01); *G06F 16/282* (2019.01); *H04L 43/12* (2013.01);
(Continued)

(58) Field of Classification Search
CPC . H04L 63/0263; H04L 67/1095; H04L 63/10; H04L 43/12; H04L 63/1408; G06F 17/30589
See application file for complete search history.

(56) References Cited

U.S. PATENT DOCUMENTS 9,338,134 B2 * 5/2016 Yin ..................... H04L 63/0236
2003/0154404 A1  8/2003 Beadles et al.
(Continued)

FOREIGN PATENT DOCUMENTS

EP  0 909 074 A1  4/1994
JP  H11168511  6/1999
(Continued)

OTHER PUBLICATIONS

International Search Report and Written Opinion, dated Sep. 24, 2014, 12 pages.
(Continued)

*Primary Examiner* — Robert B Leung
*Assistant Examiner* — Thomas Ho
(74) *Attorney, Agent, or Firm* — Hanley, Flight & Zimmerman, LLC

(57) ABSTRACT

A firewall provides improved network security by allowing the use of dynamic objects in firewall rules, where the dynamic objects evaluate to a variable set of devices. The dynamic objects may be updated from real-time data sources and non-real time inventories of data. Dynamic objects may be used for either or both of source and destination in a firewall rule. Where the dynamic object includes non-real time data, the dynamic object may be synchronized with the non-real time data inventory on a configurable basis. By using dynamic objects, the firewall can provide flexibility in the rules to allow control over user-owned and controlled devices.

21 Claims, 13 Drawing Sheets

(51) Int. Cl.
*H04L 12/26* (2006.01)
*H04L 29/08* (2006.01)
(52) U.S. Cl.
CPC .......... *H04L 63/10* (2013.01); *H04L 63/1408* (2013.01); *H04L 67/1095* (2013.01)

(56) References Cited

U.S. PATENT DOCUMENTS

| | | | | |
|---|---|---|---|---|
| 2004/0010519 | A1* | 1/2004 | Sinn | G06F 21/31 |
| 2006/0224742 | A1* | 10/2006 | Shahbazi | H04L 63/105 709/226 |
| 2007/0083924 | A1* | 4/2007 | Lu | H04L 63/0227 726/13 |
| 2008/0172347 | A1 | 7/2008 | Bernoth et al. | |
| 2010/0324945 | A1* | 12/2010 | Hessing | G06Q 40/06 705/4 |
| 2010/0333165 | A1 | 12/2010 | Basak et al. | |
| 2012/0054825 | A1 | 3/2012 | Bassett et al. | |
| 2012/0304244 | A1* | 11/2012 | Xie | G06F 21/00 726/1 |
| 2012/0304277 | A1 | 11/2012 | Li et al. | |
| 2015/0082417 | A1* | 3/2015 | Bhagwat | H04L 63/0263 726/13 |
| 2016/0057168 | A1* | 2/2016 | Reddock | H04L 63/0263 726/1 |

FOREIGN PATENT DOCUMENTS

| | | |
|---|---|---|
| JP | 2005260345 | 9/2005 |
| JP | 2006261937 A | 9/2006 |
| JP | 20050071218 A | 9/2006 |
| JP | 2010520566 A | 6/2010 |
| JP | 2010528550 | 8/2010 |
| WO | 2006004786 A1 | 1/2006 |

OTHER PUBLICATIONS

Korean Patent Office, "Notice of Preliminary Rejection," mailed in connection with Korean Patent Application No. 2016-7013252, dated Jan. 14, 2018, 20 pages.

Japanese Patent Office, "Notice of Allowance," mailed in connection with Japanese Patent Application No. 2016-540033, dated Mar. 12, 2018, 3 pages.

Japanese Patent Office, "Office Action," mailed in connection with Japanese Patent Application No. 2016-540033, dated Jun. 27, 2017, 8 pages.

European Patent Office, "Extended European Search Report," mailed in connection with European Patent Application No. 13899847.1, dated May 11, 2017, 8 pages.

State Intellectual Property Office of China, "Office Action," mailed in connection with Chinese Patent Application No. 201380081054.9, dated May 2, 2018, 10 pages.

Korean Intellectual Property Office, "Notice of Allowance," mailed in connection with Korean Patent Application No. 10-2016-7013252, dated Apr. 17, 2018, 3 pages.

State Intellectual Property Office of China, "Notification of the 2nd Office Action," mailed in connection with Chinese Patent Application No. 201380081054.9, dated Jan. 17, 2019, 6 pages.

\* cited by examiner

FIG. 1 (PRIOR ART)

CONVENTIONAL FIREWALL RULES — 100

| RULE ATTRIBUTES | SOURCE — 120 | DESTINATION — 130 | APPLICATION — 140 | TIME — 150 | DIRECTION — 160 | RESPONSE — 170 |
|---|---|---|---|---|---|---|
| RULE OPTIONS | IPV4/V6<br>NETWORK<br>GROUP<br>USER/GROUP<br>DNS NAME<br>COUNTRY<br>... | IPV4/V6<br>NETWORK<br>DNS NAME<br>COUNTRY<br>REPUTATION<br>... | P2P<br>SKYPE<br>FACEBOOK<br>CHAT<br>... | WEEKDAYS<br>WEEKEND<br>ANYTIME<br>CUSTOM<br>... | IN<br>OUT<br>BOTH | PERMIT<br>RESET<br>BLOCK<br>RATE LIMIT<br>QUARANTINE<br>PACKET CAPTURE<br>... |
| RULE 1 — 102 | 10.20.30.0/24 | DATA CENTER | ALL | ANYTIME | BOTH | PERMIT |
| RULE 2 — 104 | JOHN D | INTERNET | CHAT | WEEKDAYS | OUT | RATE LIMIT |
| RULE 3 — 106 | RESTRICTED ZONE | INTERNET | ALL | WORK HOURS | BOTH | BLOCK |
| RULE 4 — 108 | INTERNET | DMZ | FTP | ANYTIME | IN | BLOCK |

FIG. 2

INTELLIGENT FIREWALL RULES — 200

| RULE ATTRIBUTES | SOURCE — 110 | DESTINATION — 120 | APPLICATION — 130 | TIME — 140 | DIRECTION — 150 | RESPONSE — 160/170 |
|---|---|---|---|---|---|---|
| RULE OPTIONS — 210 | DYNAMIC OBJECTS ... | IPV4/V6 NETWORK DNS NAME COUNTRY REPUTATION ... | P2P SKYPE FACEBOOK CHAT ... | WEEKDAYS WEEKEND ANYTIME CUSTOM ... | IN OUT BOTH | PERMIT RESET BLOCK RATE LIMIT QUARANTINE PACKET CAPTURE ... |
| RULE 1 — 202 | MOBILE_DEVICE_WITHOUT_SECURITY | DATA CENTER | ALL | ANYTIME | BOTH | BLOCK |
| RULE 2 — 204 | HR_USERS_RUNNING_X_OS | INTERNET | ALL | WEEKDAYS | OUT | BLOCK |
| RULE 3 — 206 | ALL_SMARTPHONES_WITH_X_OS | INTERNET | P2P | WORK HOURS | BOTH | BLOCK |
| RULE 4 — 208 | ALL_WINDOWS_PART_OF_AD_AND_RUNNING_AV | DMZ | ALL | ANYTIME | BOTH | PERMIT |

INTELLIGENT FIREWALL ACCESS RULES

TECHNICAL FIELD

Embodiments described herein generally relate to network security, and in particular to intelligent firewall access rules in a "bring-your-own-device" environment.

BACKGROUND ART

Employees increasingly are not limited to company-provided devices when performing employment tasks. As more and more employees bring personal mobile devices, such as smart phones and tablets to the workplace, as well as use them in remote locations for connecting back to the office, conventional firewalls have struggled with an inability to define rules for controlling access of these devices to enterprise resources.

Bring Your Own Device (BYOD) (also called Bring Your Own Technology (BYOT), Bring Your Own Phone (BYOP), and Bring Your Own PC (BYOPC)) refers to the policy of permitting employees to bring personally owned mobile devices (laptops, tablets, and smart phones) to their workplace, and to use those devices to access privileged company information and applications.

According to some sources, BYOD is making significant inroads in the business world, with about 75% of employees in high growth markets such as Brazil and Russia and 44% in developed markets already using their own technology at work, whether or not company policy expressly allows BYOD. Some believe that BYOD may help employees be more productive. Others say it increases employee morale and convenience by using their own devices and makes the company look like a flexible and attractive employer. Some companies feel that BYOD can even be a means to attract new hires, pointing to a survey that indicates 44% of job seekers view an organization more positively if it supports their device.

Conventional firewall access rules or policies have relied on one dimensional access rules such as "Allow IP address X into network Y" and "Deny user X access to the Internet," etc. Such access rules are insufficient in BYOD environments.

BRIEF DESCRIPTION OF DRAWINGS

FIG. 1 is a table illustrating firewall rules according to the prior art.

FIG. 2 is a table illustrating firewalls rules employing dynamic objects according to one embodiment.

DESCRIPTION OF EMBODIMENTS

Figure 3:
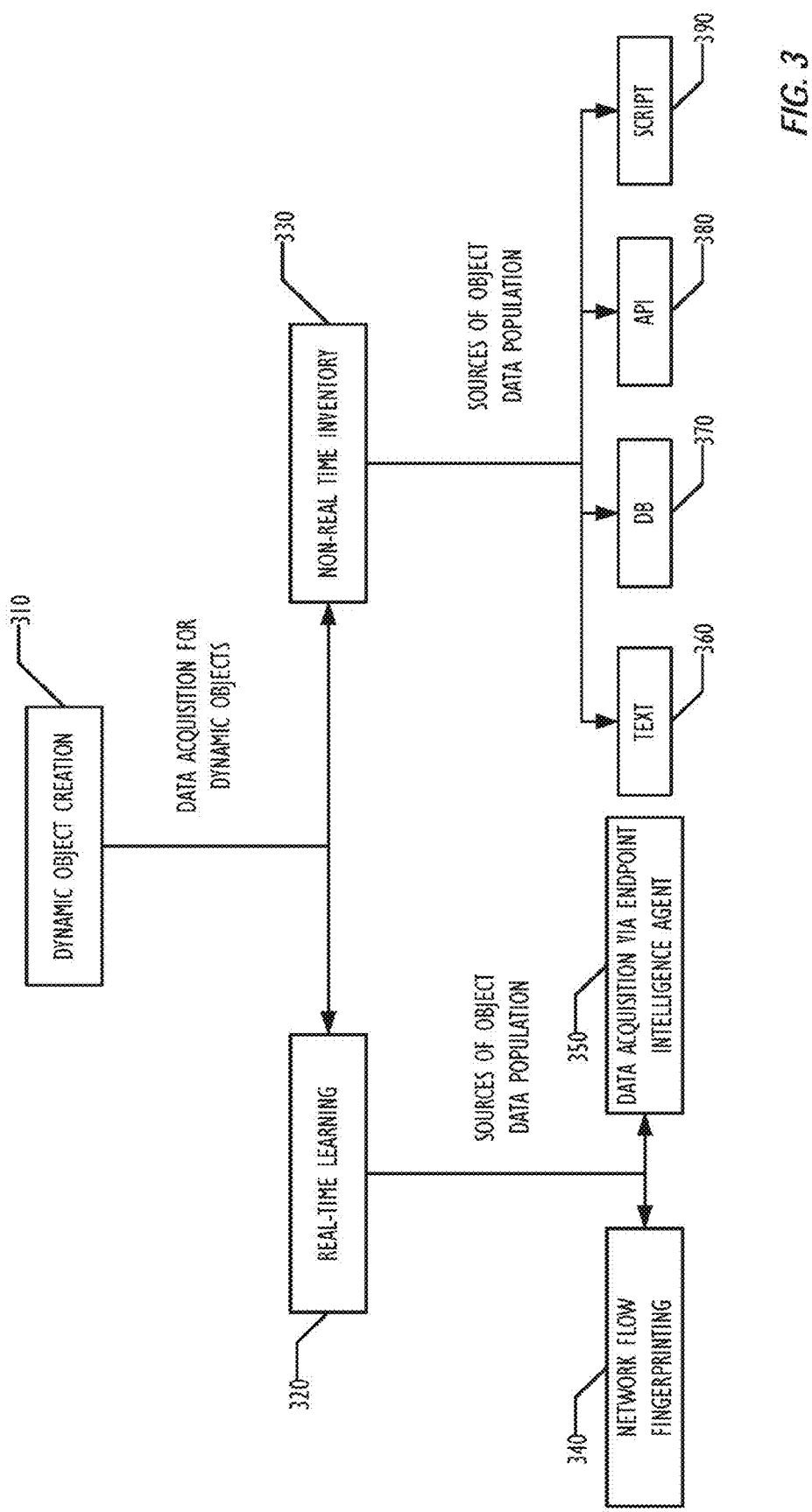
FIG. 3 is a block diagram illustrating a technique for creating a dynamic object according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by the computer system. Similarly, the term "a programmable device" can refer to a single programmable device or a plurality of programmable devices working together to perform the function described as being performed on or by the programmable device, and the term "machine readable medium" can refer to a single physical machine readable medium or a plurality of physical machine readable media that together store the material described as being stored on the machine readable medium.

BYOD environments have presented significant security issues. Some of these issues are not specific to BYOD environments. For example, data breaches may occur when devices, such as company or employee-owned laptops, are used to access corporate data and the corporate data is left on the device, which is subsequently lost or stolen. In BYOD environments, employees who leave the company do not have to return their personal devices to the company, which may result in exposure of data on those devices. In addition, however, controlling what devices should be allowed access to secure corporate resources has been very difficult to handle with conventional firewall policies.

As disclosed below, the BYOD access control is addressed via multidimensional access rules in the Firewall Policy. For example, an Information Technology (IT) administrator can impose controls via Firewall Access rules that:

Allow supported Mobile Devices running specific security software (e.g., McAfee® Endpoint Security) to access the network. (MCAFEE is a registered trademark of McAfee, Inc.).

Human Resources (HR) users are not permitted to use Android® devices. (ANDROID is a registered trademark of Google, Inc.)

Smartphones are not allowed to use peer-to-peer (P2P) application.

A smartphone/tablet is not permitted access from wired network (e.g., preventing someone trying to use his or her laptop as a hotspot).

Permit only the machines which are part of an Active Directory® (AD) domain and are running corporate approved endpoint protection to access corporate resources. (ACTIVE DIRECTORY is a registered trademark of Microsoft Corporation.)

By allowing multidimensional access rules as described below, BYOD access can be managed from trusted rules that are deployed in corporate firewalls.

Conventional firewall rules are mainly one-dimensional, and typically involve elements as illustrated in the ruleset 100 of FIG. 1. Each rule as illustrated in this prior art chart comprises rule attributes (110), a source indicator (120), a destination indicator (130), an application (140), a time (150), a direction (160), and a response (170). Example values for each are illustrated in row 180. Thus the source indicator 120 may identify an Internet Protocol (IP) address, either in IP version 4 or IP version 6 format, a network, a group, a user and group, a domain name, a country, etc. Similarly, the destination indicator 130 may identify an IP address, a network, a domain name, a country, a reputation, etc. The application 140 may identify specific applications (e.g., Skype, Facebook) or application types, such as peer-to-peer (P2P) chat, or File Transfer Protocol (FTP). The time 150 may indicate the time this rule is applicable, such as week days, the weekend, anytime, or custom time periods. The direction 160 may indicate whether the rule applies to incoming or outgoing packets or both. The response 170 may indicate the effect of satisfying the rule, such as permitting the traffic, blocking the traffic, resetting the interface, rate limiting the traffic, quarantining the traffic, or capturing packets.

Thus, for example, rules 102-108 can be established. Rule 102 would allow network traffic in both directions with a source of IP address 10.20.30.0/24, indicating an IPv4 address with a 24-bit subnet mask, a destination of anywhere in the data center, involving all applications, at any time of the day. Rule 104 would apply to outbound chat traffic with a source of user "John D," a destination of the Internet that takes place during the week days. This traffic would be allowed, but rate limited. Rule 106 would block traffic during work hours with a source in a restricted zone and a destination of the Internet, regardless of application and direction of traffic. And example rule 108 would block inbound FTP traffic with a source of the Internet and a destination of the DMZ at all times.

In conventional firewall rules, the attributes of IP, user, domain name, location, reputation, etc. are built-in. There is no way to provide a context-based limitation in the conventional rules as illustrated in FIG. 1 would apply, for example, to all Microsoft Windows® 2008 servers with endpoint security software installed, or all mobile devices running Android 3.0 or lower operating systems. (WINDOWS is a registered trademark of Microsoft Corporation.)

BYOD and consumerization are popular trends because they help in improving work efficiency, allowing workers to use their own personal devices. Therefore firewall administrators would like to be able to create, monitor, and enforce access policies that take note of rich context information associated with devices and users.

FIG. 2 is a table illustrating a ruleset according to one embodiment that expands the source and destination attributes to include context-based dynamic objects as illustrated in Row 210 of the ruleset 200, in addition to the conventional source and destination attributes. Thus, for example, rule 202 applies to any mobile device without endpoint security software installed, blocking communication with the data center regardless of application, time, or direction. Rule 204 blocks all outgoing access to the internet on weekdays for uses in the Human Resources department running the X operating system. Rule 206 blocks access to the internet by any P2P application during working hours by smartphones running the X operating system. Rule 208 permits any device running Microsoft Windows that is part of an Active Directory and that is running an antivirus program to access the DMZ at any time, regardless of application. Active Directory is a directory service implemented by Microsoft for Windows domain networks. It is included in most Windows Server operating systems. Other directory services or other types of sources of non-real time data may be specified in the rules. These rules are illustrative and by way of example only, and other dynamic objects can be implemented and specified in rulesets as desired, and other rule attributes may be used as desired.

In some embodiments, dynamic objects used in rulesets may be created in real time by an appliance that analyzes traffic on network segments, such as the McAfee Network Security Sensor. In other embodiments, dynamic objects may be synchronized with data maintained by non-real time data sources. Dynamic objects in rulesets provide flexibility for the firewall administrator in defining how objects are created and maintained, providing flexibility for BYOD control. The dynamic objects define a variable set of devices that correspond to the dynamic object, instead of a predefined static set of devices as in conventional rulesets.

Because they are dynamic objects, merely defining a term to be placed in a ruleset is not sufficient; the dynamic object must be created and given meaning. In various embodiments, a firewall administrator may configure various data sources and conditions to build the dynamic object. FIG. 3 is a block diagram illustrating some ways of creating a dynamic object.

In FIG. 3, dynamic object creation in block 310 depends upon acquisition of data for the dynamic objects from one or both of two types of sources: real-time learning (320) and non-real time data inventory (330). Real-time learning (320) involves actively or passively gathering data for populating the dynamic object in real-time. Such real-time learning is typically obtained through one or more of hardware and software monitors that acquire the data, such as an appliance that analyzes traffic on network segments. The monitoring may be passive (340), collecting network flow fingerprints, or active (350), such as acquiring data by an endpoint intelligent agent that actively collects useful data, as described in more detail below. The dynamic object, once created, is automatically updated in real-time as the real-time learning occurs.

Non-real time data inventory (330) data is data obtained from sources that may be outside of the control of the firewall rules creation process. In typical embodiments, the data is obtained for reasons other than the creation of firewall rules, and is stored in a data repository that can be accessed by the dynamic object creation process. The non-real time data sources may be controlled by the enterprise running the firewall or may be controlled by a third party, as desired. Because this data is collected and stored externally to the dynamic object creation process, the data used to create and populate the dynamic objects may be extracted on a scheduled basis, such as periodically. Once the dynamic object is created, the non-real time data inventory is synchronized with the dynamic object by re-accessing the non-real time data inventory and updating the dynamic object as necessary based on changes in the non-real time data inventory. The non-real time data inventory may depend upon data sources of any desired type, including text files 360, databases 370, application programming interfaces (APIs) 380, or scripts 390. When synchronizing the dynamic object with the non-real time data inventory, the non-real time data inventory is accessed or queried for the desired data, which may then be returned to populate the dynamic object 310.

For example, consider a dynamic object such as "mobile_devices_with_security," the dynamic object in example rule 202 of FIG. 2. Various embodiments may allow the dynamic object configured by the firewall administrator to populate as illustrated in the block diagram of FIG. 4.

In this example, dynamic object 410 "mobile_devices_with_security" may be configured as the combination of conditions 420-440. In condition 420, real-time learning may be used to discover that the device matches patterns that correspond to a signature for mobile devices. These patterns may be built-in to the dynamic object creation software or may be user defined. In this example, the condition may be tested by using passive fingerprinting of Transmission Control Protocol (TCP), Dynamic Host Configuration Protocol (DHCP), or Hypertext Transfer Protocol (HTTP) user agent network traffic, looking for packet data that corresponds to mobile devices. This list of passive fingerprinting data sources is illustrative and by way of example only, and other passive data sources and types of network traffic may be used, in addition to actively obtained data.

The second condition 430 determines whether the network traffic matches a pattern that corresponds to a signature that verifies that the device is in secure communication with a security vendor manager server. The third condition 440 determines whether the IP address for the device is within an IP address range for securely managed mobile devices. If condition 420 and either of conditions 430 or 440 are satisfied, then the mobile device is considered a mobile device with security, and the dynamic object is populated with information corresponding to that device.

Figure 4:
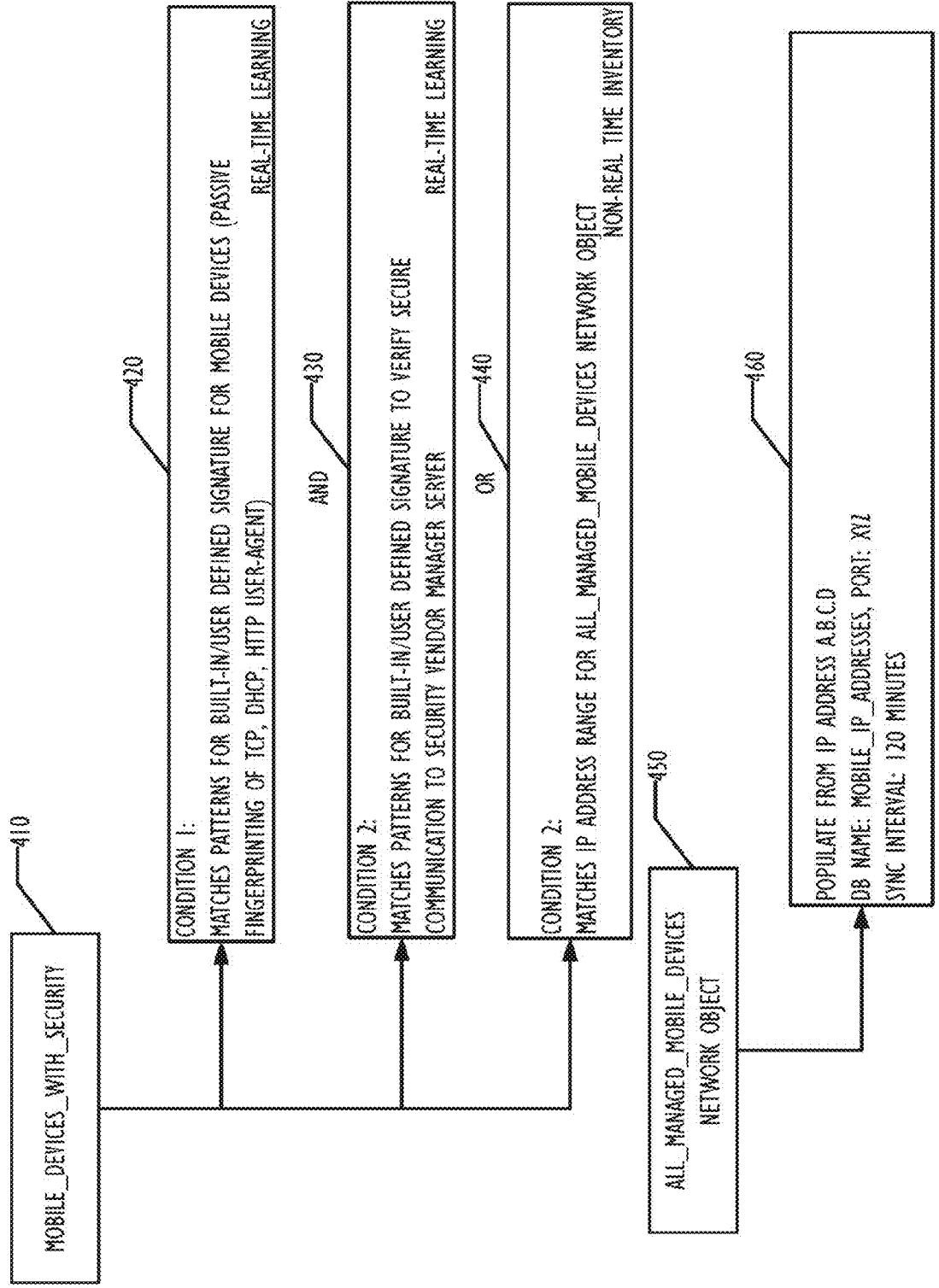
FIG. 4 is a block diagram illustrating conditions for determining a match with a dynamic object according to one embodiment.

As illustrated in FIG. 4, condition 440 may depend upon another dynamic object, in this example the "all_managed_mobile_devices" network object 450, which is a non-real time data inventory object. Thus condition 440 is also a non-real time data inventory object. In some embodiments, dynamic objects may be defined based on an arbitrary hierarchy of dynamic objects, but if any object in the hierarchy is a non-real time data inventory object, the dynamic object is also considered a non-real time data inventory object.

As illustrated in FIG. 4, the all_managed_mobile_devices network object 450 provides information about an IP address range that is known to correspond to mobile devices. In block 460, the network object 450 includes instructions to populate the network object from a data base named mobile_IP_addresses, at IP address A.B.C.D, port XYZ. The network object 450 is defined to synchronize with the remote database every 120 minutes. Changes that occur in the mobile_IP_addresses database between synchronizations will not be reflected in the dynamic object until the next synchronization event.

Figure 5:
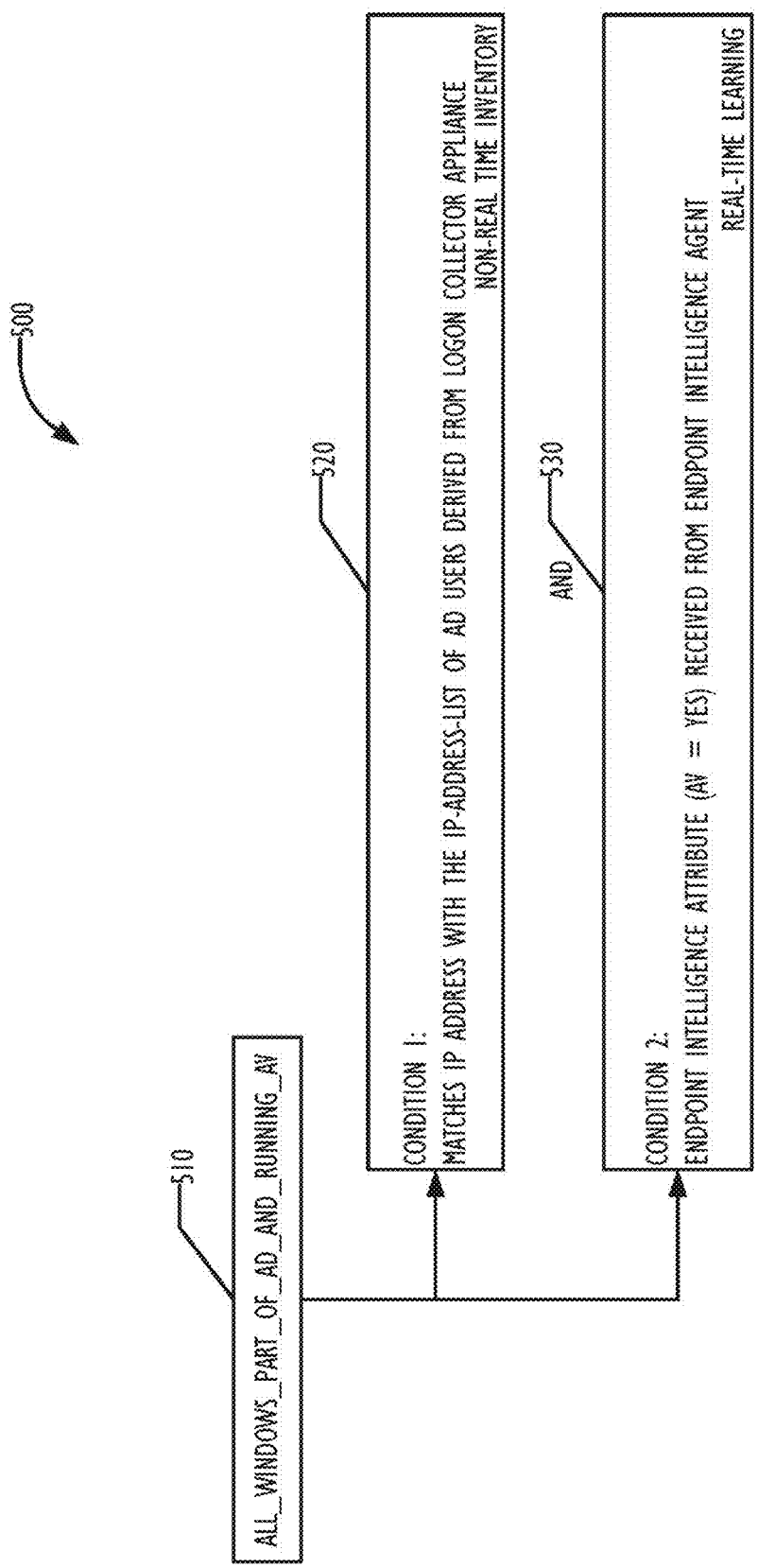
FIG. 5 is a block diagram illustrating other conditions for determining a match with a dynamic object according to one embodiment.

FIG. 5 is a chart illustrating another example of a dynamic object configuration, in this case a dynamic object 510 referring to all Microsoft Windows devices that are part of Active Directory and running an anti-virus program, such as is used in rule 208 of FIG. 2. Two conditions are used to define the dynamic object 510. Condition 520 uses a non-real time IP address list of Active Directory users, matching the IP address of the current device with the IP address list to determine if the device is a Windows machine that is part of Active Directory. Condition 530 is a real-time learning condition, that depends on receiving real-time information from an endpoint running an endpoint intelligence agent software that indicates whether the device is running an anti-virus software. If both conditions 520 and 530 are satisfied, then the current device matches the dynamic object 510 in the ruleset.

Figure 6:
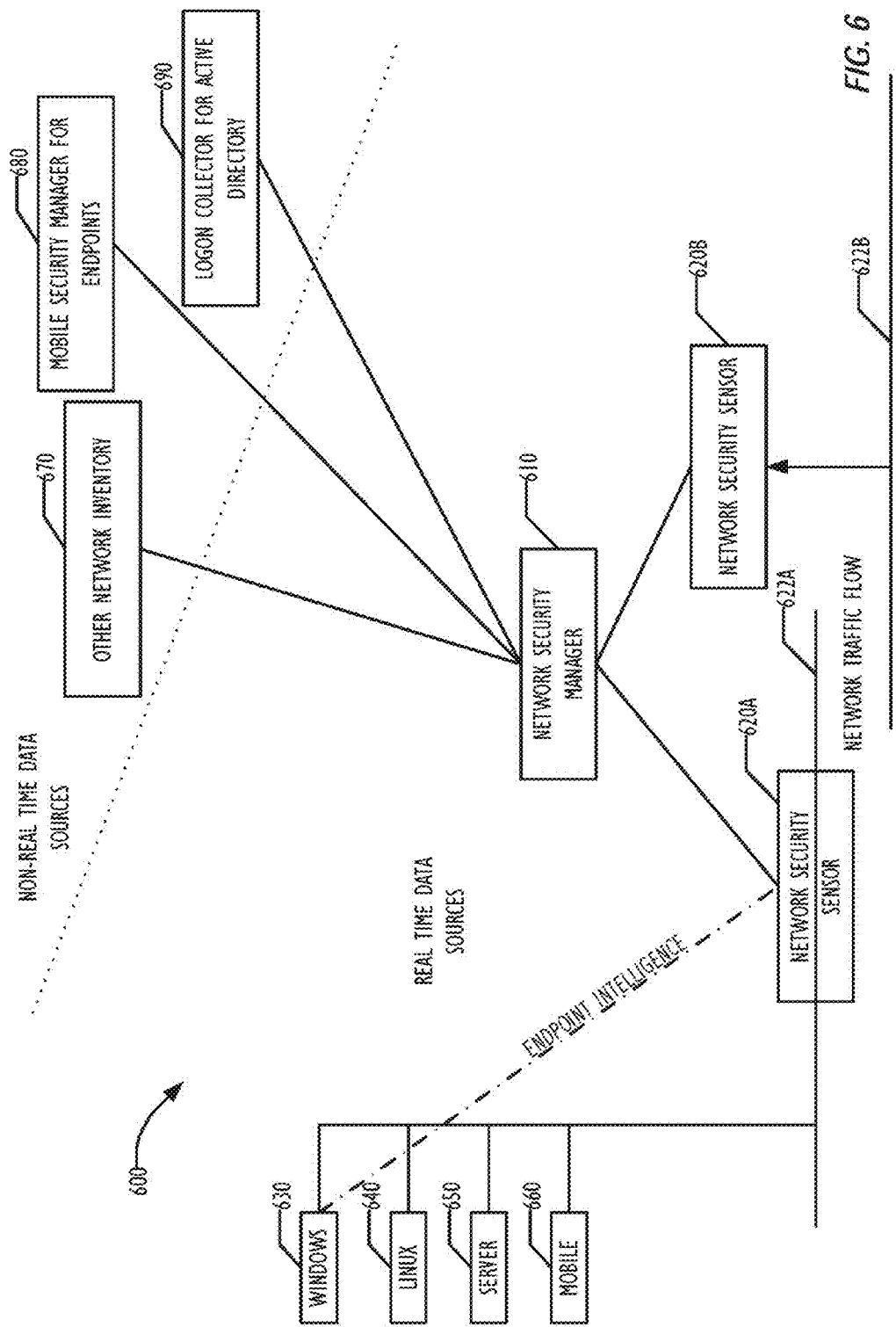
FIG. 6 is a block diagram illustrating a network of devices used for collecting data for dynamic objects according to one embodiment.

FIG. 6 is a block diagram illustrating a network security system employing dynamic objects according to one embodiment. A network security manager 610 provides firewall services based on rulesets such as are illustrated in FIG. 2. Dynamic objects that employ real-time learning conditions, such as described above, are used by the network security manager 610 firewall functionality. The network security manager 610 may provide other network security services as desired.

Network security sensors 620A,B monitor network traffic on networks 622A and 622B, respectively. BYOD devices 630 (a Microsoft Windows device), 640 (a Linux® device), 650 (a server), and 660 (a mobile device) are connected to network 622A. (LINUX is a registered trademark of Linus Torvalds.) Network security sensor 620A may capture network traffic flow data to provide real-time data for dynamic objects employed by the rulesets used by network security manager 610. In addition, the Windows device 630 may have installed agent software that provides active or passive data collection from the device 630, passing that data in real time to the network security sensor 620A for use in populating the dynamic objects used by network security manager 610.

Non-real time data sources are also available to the network security manager 610 illustrated in FIG. 6. These may include a logon collector for Active Directory 690, a mobile security manager for endpoints 680, and other network inventory data sources 670. The network security manager 610 may query or otherwise obtain non-real time data from these non-real time data sources for populating the dynamic objects used by the rulesets of the network security manager 610. Any desired communication technique may be used between the network security manager 610 and the non-real time data sources 670-690. The network security manager 610 may synchronize its dynamic object data with the non-real time data sources 670-690 on a scheduled basis, such as a configurable periodic basis, or may perform synchronization on a non-scheduled event-driven basis as desired.

Figure 7:
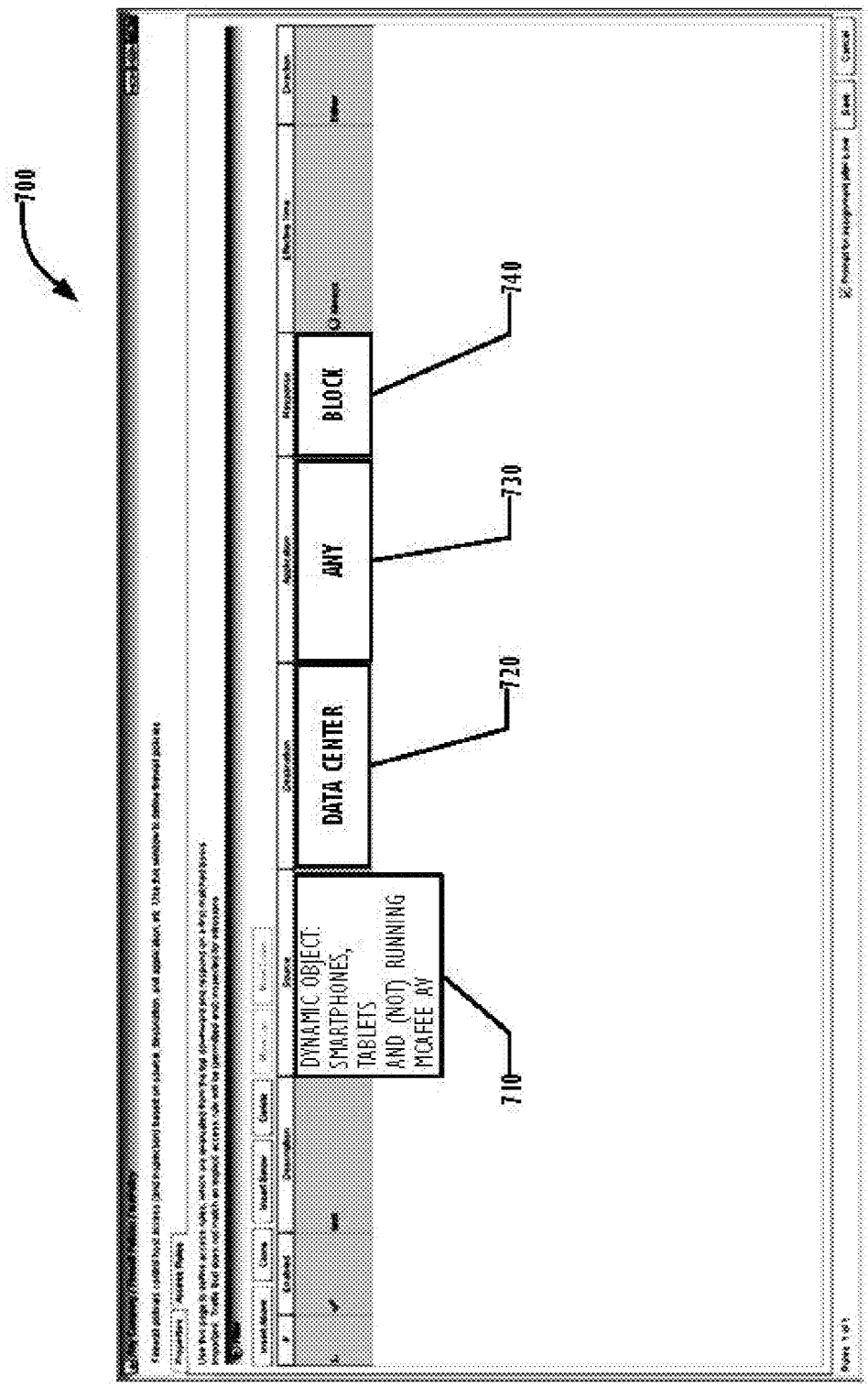
FIG. 7 is a screenshot illustrating a user interface for defining a dynamic object according to one embodiment.

FIG. 7 illustrates an example user interface 700 for a network security manager 610 that implements firewall rulesets using dynamic objects. Firewall administrator users may enable and disable rules in rule sets that may employ dynamic objects as either the source or destination attribute (or both). In this example, the user has defined a rule in which the source attribute is a dynamic object 710, specifying that it applies to smartphones and tablets that are not running a McAfee Antivirus. The destination 720 indicates any device in the datacenter; the application 730 indicates any application; and the response 740 indicates that the network traffic will be blocked if the rule is satisfied.

With the network security manager 610 having intelligence about the device, users, and context, many types of rules employing dynamic objects that could not be created in conventional firewall rulesets can be created. For example, only IOS devices running a particular security software may be allowed to access the network. A smartphone or tablet may be prohibited on a wired network, stopping someone who tries to use his or her mobile device as a hotspot. Enterprise security policies may be enforced on BYOD devices by permitting only machines with appropriate security protection access to the corporate resources or network. These are only examples of the enhanced capability provided by dynamic context-aware objects that may be employed in rule sets for the firewall.

The user interface illustrated in FIG. 7 may also allow the firewall administrator to view the synchronization status of a dynamic object that is synchronized with a non-real time data inventory, in addition to allowing the administrator to configure synchronization.

Synchronization preferably is configurable on a per dynamic object basis, and log files or other techniques may be used to show the data exchanged with the non-real time data inventory data source, as well as provide information about the status of the synchronization, including any synchronization failures.

Figure 8:
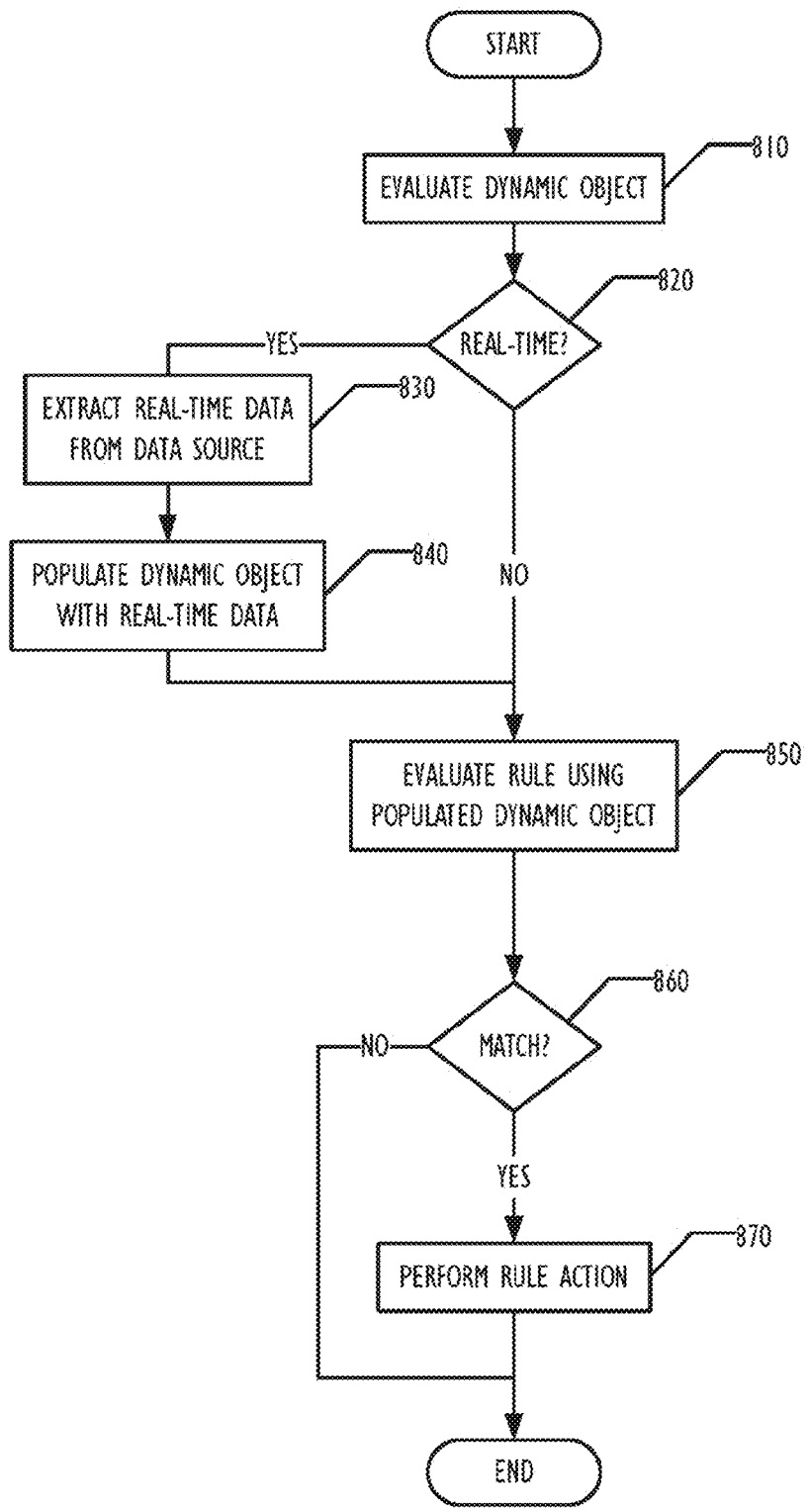
FIG. 8 is a flowchart illustrating a technique for evaluating a rule employing dynamic objects according to one embodiment.

FIG. 8 is a flowchart illustrating use of a dynamic object in rule evaluation. Where a rule employs multiple dynamic objects, this technique may be performed for each dynamic object in parallel or in sequence as desired. In block 810, the dynamic object employed by the rule may be evaluated. If in block 820 the dynamic object is one obtaining its data from a real-time data source, then in block 830 the real-time data is extracted from the data source and in block 840 the dynamic object is populated with the real-time data that identifies the devices that correspond to the dynamic object. Any desired technique may be used for storing the data populating the dynamic object, including lists and lookup tables. For example, the dynamic object when evaluated may result in a list of IP addresses of the devices currently in the network that match the dynamic object. In an alternate embodiment, instead of extracting data from the real-time data source when the dynamic object is evaluated, the real-time data source may transmit data to the network security manager 610 for updating the dynamic object any time the network sensors 620A,B detect a change in the relevant to the dynamic object. Thus in some embodiments, the network sensors 620A,B may be aware of the dynamic objects managed by the network security manager 610, while in other embodiments, the network sensors need only be able to respond to real-time requests for the data from the network security manager 610.

If the dynamic object is not a real-time object or after completion of the real-time update, the rule is evaluated using the populated dynamic object in block 850. If the rule applies to the network traffic being considered by the firewall, as determined in block 860, then in block 870 the rule action is taken, blocking the traffic, permitting the traffic, etc.

Figure 9:
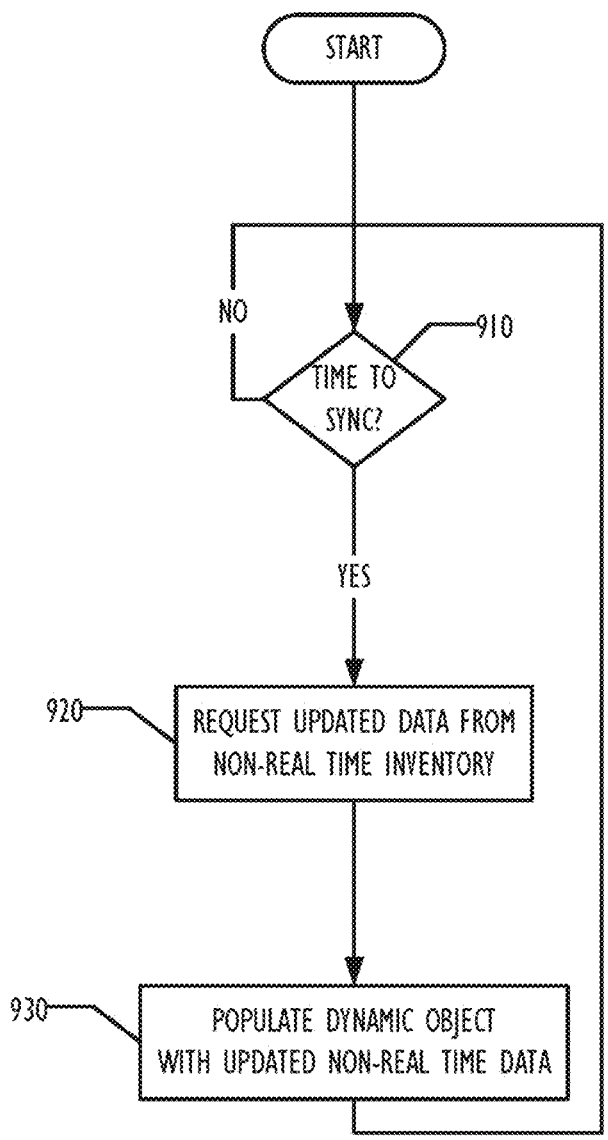
FIG. 9 is a flowchart illustrating a technique for synchronizing dynamic objects with a non-real time data inventory according to one embodiment.

FIG. 9 is a flowchart illustrating synchronization of a dynamic object with a non-real time data inventory data source. In block 910, if the configured synchronization time has occurred, such as by the lapse of a periodic time or the occurrence of a configured event, then in block 920 updated data may be requested from a non-real time data inventory identified in the dynamic object configuration. Although described as a request for updated data, in an alternate embodiment, instead of a request being made to a non-real time data inventory, the non-real time data inventory may initiate the data transfer.

In block 930, once the updated data has been obtained from the non-real time data inventory, the updated data is used to populate the dynamic object, similar to how the real-time dynamic object is updated as described above. In one embodiment, the populated data for the dynamic object is stored identically, regardless of whether the dynamic object is updated in real time or by synchronization with a non-real time data inventory.

The populated data object may then be used for rule evaluation with data that remains the same until the next synchronization time or event.

Figure 10:
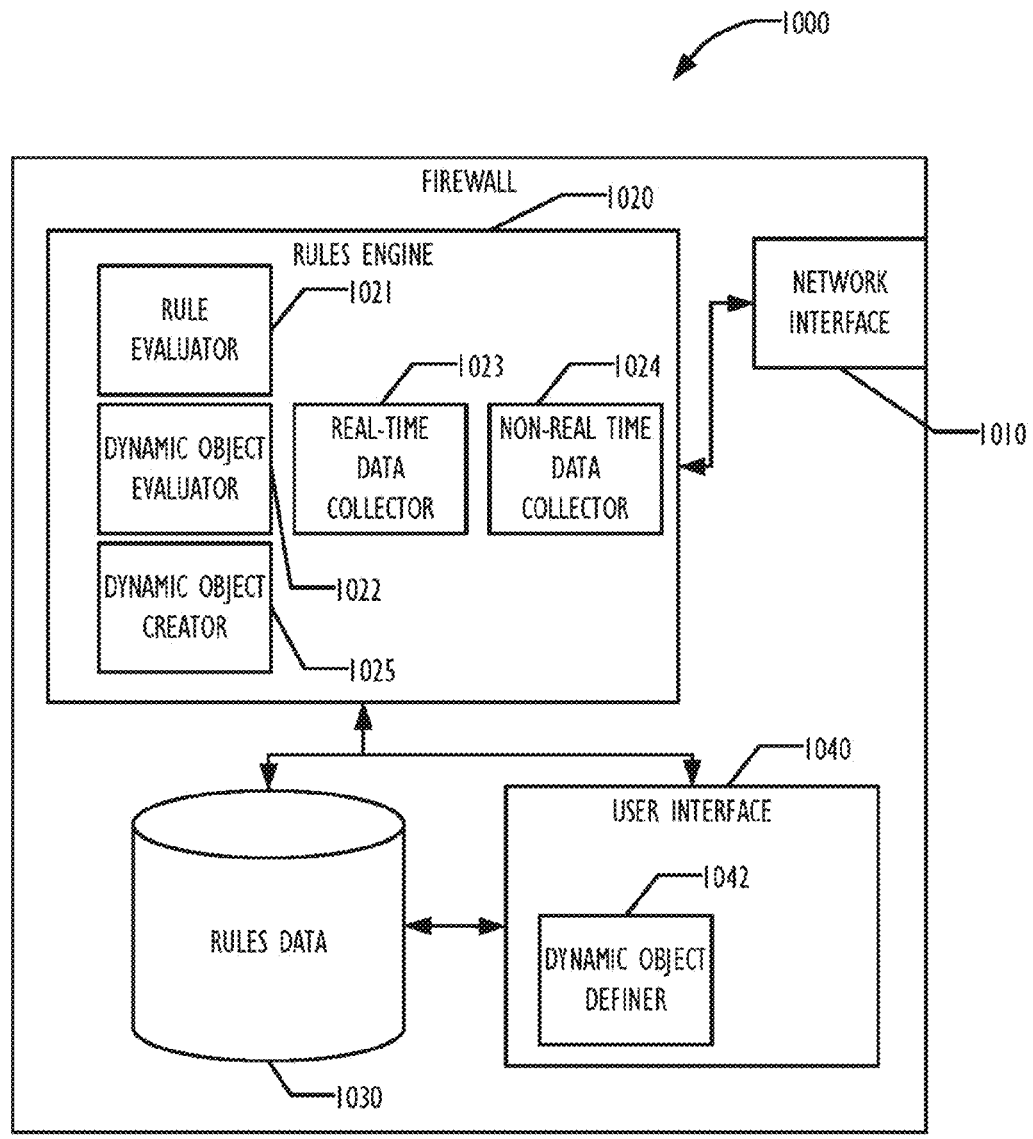
FIG. 10 is a block diagram illustrating elements of a firewall according to one embodiment.

FIG. 10 is a block diagram illustrating elements of a firewall 1000 implementing the dynamic object rule techniques described above according to one embodiment. The firewall may be implemented as a dedicated appliance device or may be implemented as an element of a broader network security manager device that performs other network security operations. Only those elements of the firewall specifically related to the disclosure above are illustrated in FIG. 10; one of skill in the art will understand that other firewall elements may be present.

A network interface 1010 provides network connectivity for the firewall to the network or networks that it protects. Multiple network interfaces 1010 may be provided as desired. In some embodiments, the firewall may use one network interface 1010 for monitoring network traffic and a different network interface may be used for accessing the non-real time data inventory devices for collecting non-real time data for use in populating the dynamic objects. In other embodiments, the same network interface may be used for both. Similarly, the firewall may use one network interface 1010 for monitoring network traffic and a different network interface for collecting real-time data for use in populating the dynamic objects.

A rules engine 1020 provides support for evaluating the firewall rules that control what traffic is blocked, allowed, etc. by the firewall 1000. The rules engine 1020 in one embodiment includes a rule evaluator module 1021 for evaluating firewall rules, a dynamic object evaluator 1022 for evaluating a dynamic object configured to evaluate a dynamic object for use by the rule evaluator module 1021, a real-time data collector 1023 for obtaining real-time data for use in populating dynamic objects, a non-real time data collector 1024 for synchronizing with non-real time data inventory sources, and a dynamic object creator module 1025 for creating and populating dynamic objects with real-time data, non-real time data, or both.

A rules data store 1030 may be used for storing rule data. Any desired way for storing rules data, including dynamic object data, may be used. The rules data store 1030 may be organized in any desired manner. The dynamic object creator module may store dynamic objects in the rules data store 1030 for use with firewall rules.

A user interface 1040 may be provided for creating and editing firewall rules, including dynamic objects. To that end, a dynamic object definer 1042 may be provided for defining dynamic objects, including the conditions that need to be met to match the dynamic object at rule evaluation time.

The rules engine 1020 and user interface 1040 may be implemented in hardware, firmware, software, or any combination thereof.

Figure 11:
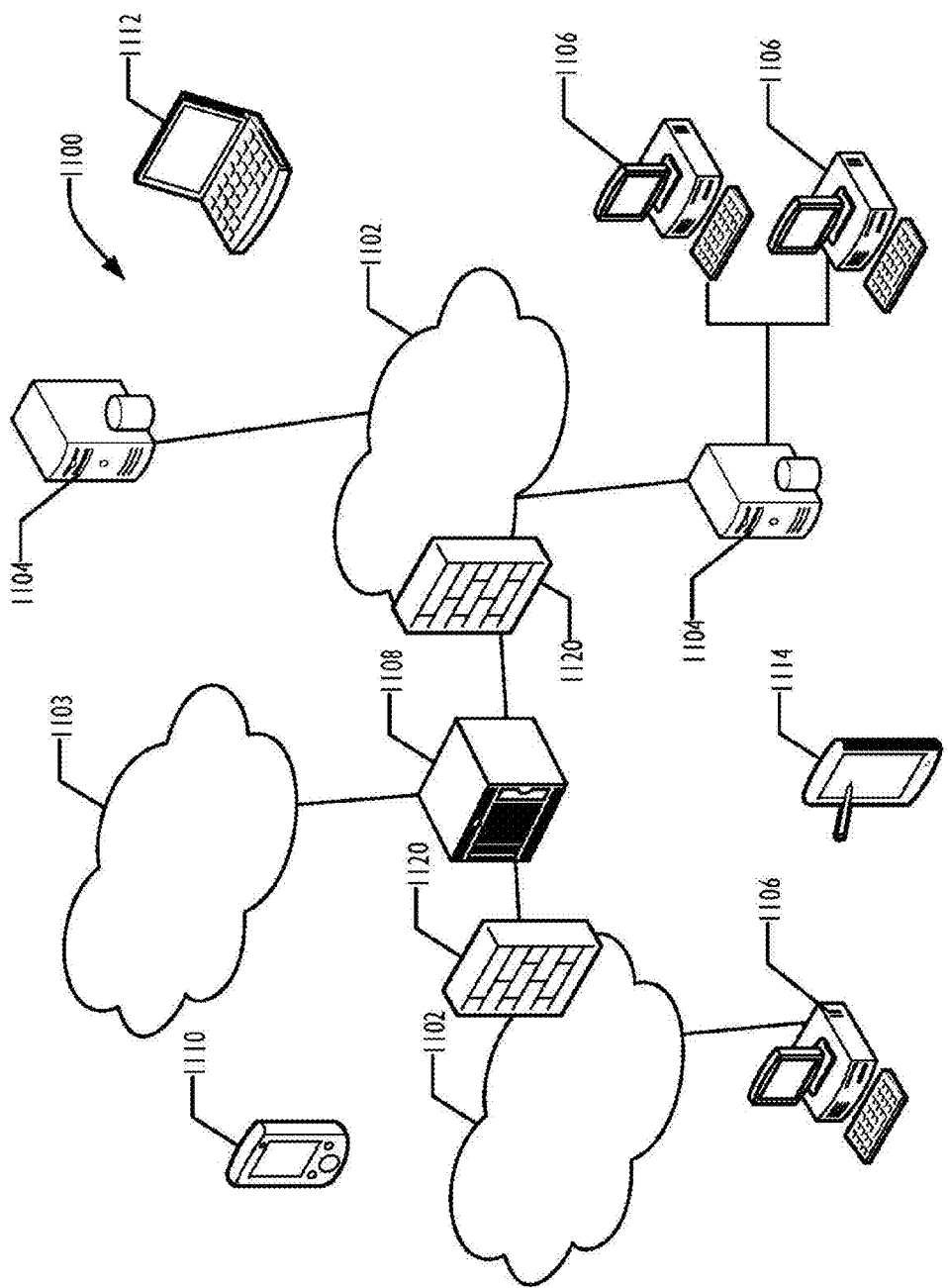
FIG. 11 is a block diagram illustrating a network infrastructure in which a firewall employing dynamic objects may be implemented according to one embodiment.

Referring now to FIG. 11, an example infrastructure 1100 in which the techniques described above may be implemented is illustrated schematically Infrastructure 1100 contains computer networks 1102 that can be protected by a firewall using rulesets with dynamic objects as described above. Computer networks 1102 may include many different types of computer networks available today, such as the Internet, a corporate network, or a Local Area Network (LAN). Each of these networks can contain wired or wireless programmable devices and operate using any number of network protocols (e.g., TCP/IP). Networks 1102 may be connected to gateways and routers (represented by 1108), end user computers 1106, and computer servers 1104. Infrastructure 1100 also includes cellular network 1103 for use with mobile communication devices. Mobile cellular networks support mobile phones and many other types of devices. Mobile devices in the infrastructure 1100 are illustrated as mobile phones 1110, laptops 112, and tablets 1114. Any of the devices illustrated in FIG. 11 may be a BYOD device, although typically the BYOD devices are mobile devices such as the mobile phones 1110, laptops 112, and tablets 1114. Firewalls 1120 protect access to and from the computer networks 1002.

Figure 12:
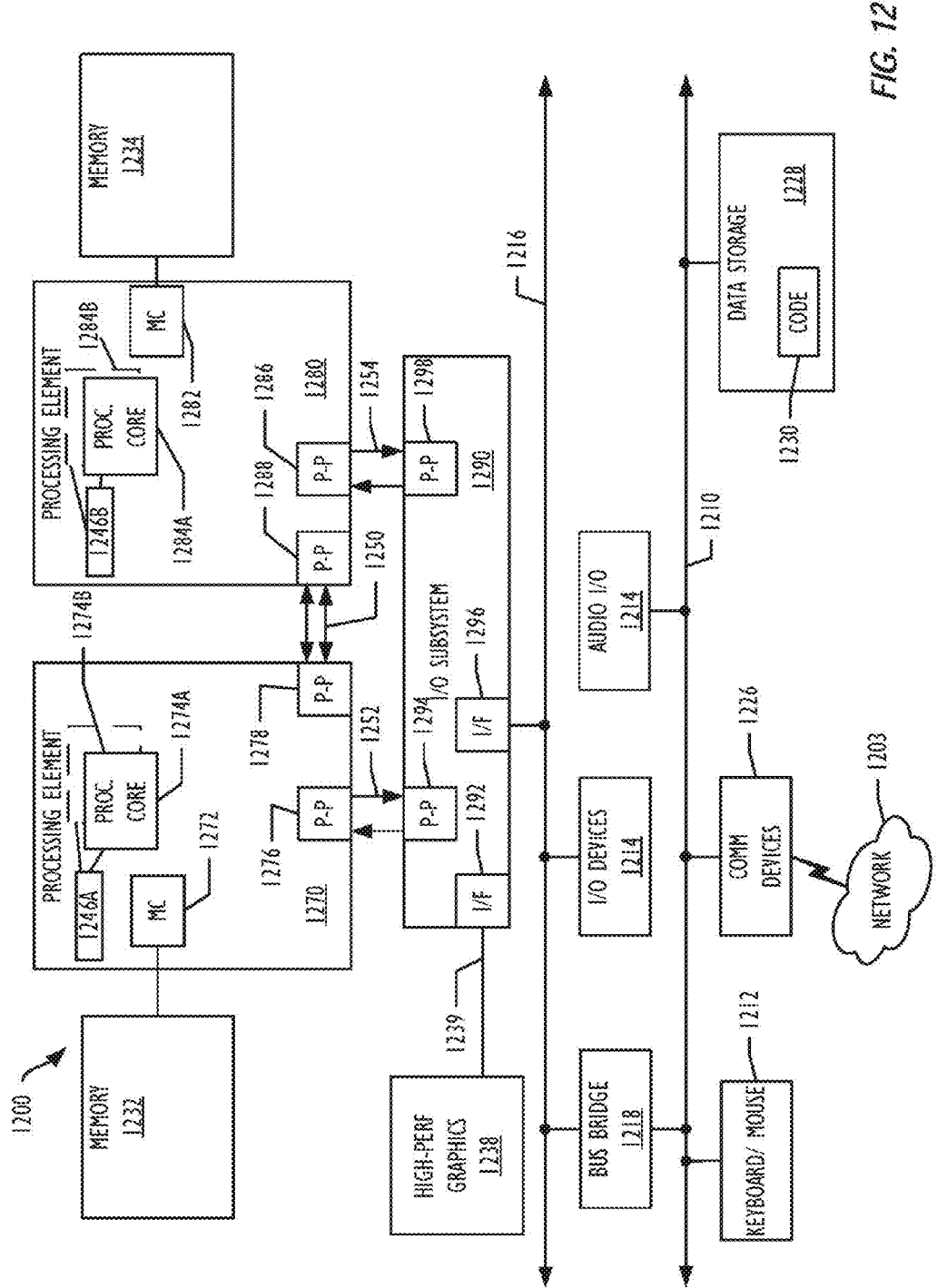
FIG. 12 is a block diagram illustrating a programmable device in which a firewall employing dynamic objects may be implemented according to one embodiment.

Referring now to FIG. 12, a block diagram illustrates a programmable device 1200 that may employ the generic unpacking techniques described above in accordance with one embodiment. The programmable device illustrated in FIG. 12 is a multiprocessor programmable device 1200 that includes a first processing element 1270 and a second processing element 1280. While two processing elements 1270 and 1280 are shown, an embodiment of programmable device 1200 may also include only one such processing element.

Programmable device 1200 is illustrated as a point-to-point interconnect system, in which the first processing element 1270 and second processing element 1280 are coupled via a point-to-point interconnect 1250. Any or all of the interconnects illustrated in FIG. 12 may be implemented as multi-drop bus rather than point-to-point interconnects.

As illustrated in FIG. 12, each of processing elements 1270 and 1280 may be multicore processors, including first and second processor cores (i.e., processor cores 1274*a* and 1274*b* and processor cores 1284*a* and 1284*b*). Such cores 1274*a*, 1274*b*, 1284*a*, 1284*b* may be configured to execute instruction code in a manner similar to that discussed above in connection with FIGS. 1-3. However, other embodiments may use processing elements that are single core processors as desired. In embodiments with multiple processing elements 1270, 1280, each processing element may be implemented with different numbers of cores as desired.

Each processing element 1270, 1280 may include at least one shared cache 1246. The shared cache 1246*a*, 1246*b* may store data (e.g., instructions) that are utilized by one or more components of the processing element, such as the cores 1274*a*, 1274*b* and 1284*a*, 1284*b*, respectively. For example, the shared cache may locally cache data stored in a memory 1232, 1234 for faster access by components of the processing elements 1270, 1280. In one or more embodiments, the shared cache 1246*a*, 1246*b* may include one or more mid-level caches, such as level 2 (L2), level 3 (L3), level 4 (L4), or other levels of cache, a last level cache (LLC), or combinations thereof.

While FIG. 12 illustrates a programmable device with two processing elements 1270, 1280 for clarity of the drawing, the scope of the present invention is not so limited and any number of processing elements may be present. Alternatively, one or more of processing elements 1270, 1280 may be an element other than a processor, such as an graphics processing unit (GPU), a digital signal processing (DSP) unit, a field programmable gate array, or any other programmable processing element. Processing element 1280 may be heterogeneous or asymmetric to processing element 1270. There can be a variety of differences between the processing elements 1270, 1280 in terms of a spectrum of metrics of merit including architectural, microarchitectural, thermal, power consumption characteristics, and the like. These differences may effectively manifest themselves as asymmetry and heterogeneity amongst the processing elements 1270, 1280. In some embodiments, the various processing elements 1270, 1280 may reside in the same die package.

First processing element 1270 may further include memory controller logic (MC) 1272 and point-to-point (P-P) interconnects 1276 and 1278. Similarly, second processing element 1280 may include a MC 1282 and P-P interconnects 1286 and 1288. As illustrated in FIG. 12, MCs 1272 and 1282 couple the processing elements 1270, 1280 to respective memories, namely a memory 1232 and a memory 1234, which may be portions of main memory locally attached to the respective processors. While MC logic 1272 and 1282 is illustrated as integrated into the processing elements 1270, 1280, in some embodiments the MC logic may be discrete logic outside the processing elements 1270, 1280 rather than integrated therein.

Processing element 1270 and processing element 1280 may be coupled to an I/O subsystem 1290 via P-P interconnects 1276, 1286 and 1284, respectively. As illustrated in FIG. 12, I/O subsystem 1290 includes P-P interconnects 1294 and 1298. Furthermore, I/O subsystem 1290 includes an interface 1292 to couple I/O subsystem 1290 with a high performance graphics engine 1238. In one embodiment, bus 1249 may be used to couple graphics engine 1238 to I/O subsystem 1290. Alternately, a point-to-point interconnect 1239 may couple these components.

In turn, I/O subsystem 1290 may be coupled to a first link 1216 via an interface 1296. In one embodiment, first link 1216 may be a Peripheral Component Interconnect (PCI) bus, or a bus such as a PCI Express bus or another I/O interconnect bus, although the scope of the present invention is not so limited.

As illustrated in FIG. 12, various I/O devices 1214 may be coupled to first link 1216, along with a bridge 1218 which may couple first link 1216 to a second link 1210. In one embodiment, second link 1220 may be a low pin count (LPC) bus. Various devices may be coupled to second link 1220 including, for example, a keyboard/mouse 1212, communication device(s) 1226 (which may in turn be in communication with the computer network 1203), and a data storage unit 1228 such as a disk drive or other mass storage device which may include code 1230, in one embodiment. The code 1230 may include instructions for performing embodiments of one or more of the techniques described above. Further, an audio I/O 1224 may be coupled to second bus 1220.

Note that other embodiments are contemplated. For example, instead of the point-to-point architecture of FIG. 12, a system may implement a multi-drop bus or another such communication topology. Although links 1216 and 1220 are illustrated as busses in FIG. 12, any desired type of link can be used. Also, the elements of FIG. 12 may alternatively be partitioned using more or fewer integrated chips than illustrated in FIG. 12.

Figure 13:
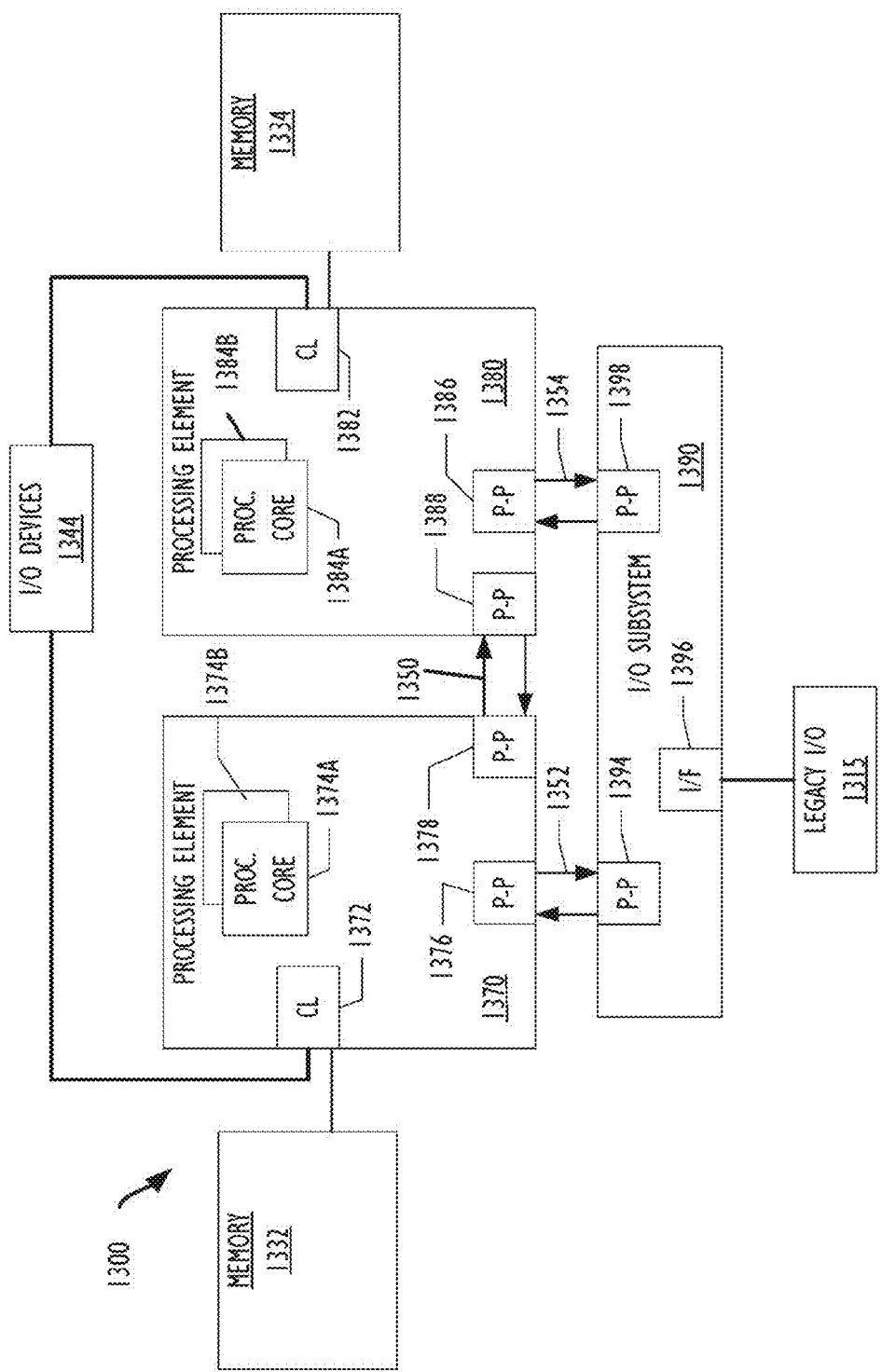
FIG. 13 is a block diagram illustrating a programmable device in which a firewall employing dynamic objects may be implemented according to another embodiment.

Referring now to FIG. 13, a block diagram illustrates a programmable device 1300 according to another embodiment. Certain aspects of FIG. 12 have been omitted from FIG. 13 in order to avoid obscuring other aspects of FIG. 13.

FIG. 13 illustrates that processing elements 1370, 1380 may include integrated memory and I/O control logic ("CL") 1372 and 1382, respectively. In some embodiments, the CL 1372, 1382 may include memory control logic (MC) such as that described above in connection with FIG. 12. In addition, CL 1372, 1382 may also include I/O control logic. FIG. 13 illustrates that not only may the memories 1332, 1334 be coupled to the CL 1372, 1382, but also that I/O devices 1314 may also be coupled to the control logic 1372, 1382. Legacy I/O devices 1315 may be coupled to the I/O subsystem 1390.

The programmable devices depicted in FIGS. 12 and 13 are schematic illustrations of embodiments of programmable devices which may be utilized to implement various embodiments discussed herein. It will be appreciated that various components of the programmable devices depicted in FIGS. 12 and 13 may be combined in a system-on-a-chip (SoC) architecture.

EXAMPLES

The following examples pertain to further embodiments.

Example 1 is a machine readable medium on which are stored instructions, comprising instructions that when executed cause a firewall device to: create a dynamic object for use in a firewall rule, the dynamic object defining a variable group of devices; populate the dynamic object from data received from sources external to the firewall; and evaluate the dynamic object as part of evaluating the firewall rule.

Example 2 includes the subject matter of example 1, wherein the instructions that when executed cause the firewall device to populate the dynamic object comprise instructions that when executed cause the firewall device to: receive device data from a real-time data source; and populate the dynamic object with the received device data.

Example 3 includes the subject matter of example 2, wherein the instructions that when executed cause the firewall device to receive device data from a real-time data source comprise instructions that when executed cause the firewall device to: request device data from a network security device monitoring a network.

Example 4 includes the subject matter of example 1, wherein the instructions that when executed cause the firewall device to populate the dynamic object comprise instructions that when executed cause the firewall device to: receive device data from a non-real time data inventory; and populate the dynamic object with the received device data.

Example 5 includes the subject matter of example 1, wherein the instructions that when executed cause the firewall device to receive device data from a non-real time data inventory comprise instructions that when executed cause the firewall device to: synchronize the dynamic object with the non-real time data inventory.

Example 6 includes the subject matter of example 1, wherein the instructions that when executed cause the firewall device to receive device data from a non-real time data inventory comprise instructions that when executed cause the firewall device to: query the non-real time data inventory for device information.

Example 7 includes the subject matter of examples 1-6, wherein the instructions further comprise instructions that when executed cause the firewall device to: provide a user interface for defining dynamic objects and defining rules that employ dynamic objects.

Example 8 includes the subject matter of example 1, wherein the dynamic object evaluates to a variable set of devices.

Example 9 includes the subject matter of example 1, wherein the instructions that when executed cause the firewall device to populate the dynamic object comprise instructions that when executed cause the firewall device to: receive device data from a real-time data source; and populate the dynamic object with the received device data,
wherein the instructions that when executed cause the firewall device to receive device data from a real-time data source optionally comprise instructions that when executed cause the firewall device to: request device data from a network security device monitoring a network.

Example 10 includes the subject matter of example 1, wherein the instructions that when executed cause the firewall device to populate the dynamic object comprise instructions that when executed cause the firewall device to: receive device data from a non-real time data inventory; and populate the dynamic object with the received device data, wherein the instructions that when executed cause the firewall device to receive device data from a non-real time data inventory comprise instructions that when executed cause the firewall device to: synchronize the dynamic object with the non-real time data inventory.

Example 11 is a method of providing a firewall for a network, comprising: defining a firewall rule that employs a dynamic object, the dynamic object defining a variable set of corresponding devices; populating the variable set of the dynamic object from at least one of a real-time data source and a non-real time data inventory; and matching a device corresponding to network traffic against the dynamic object as part of evaluating the firewall rule.

Example 12 includes the subject matter of example 11, further comprising: taking an action responsive to evaluating the firewall rule.

Example 13 includes the subject matter of examples 11-12, further comprising: synchronizing the dynamic object with a non-real time data inventory of device information.

Example 14 includes the subject matter of example 13, wherein synchronizing the dynamic object with a non-real time data inventory of device information comprises: querying the non-real time data inventory; and updating the dynamic object with results obtained by querying the non-real time data inventory.

Example 15 includes the subject matter of examples 11-12, further comprising: obtaining real-time device information; and populating the dynamic object with the real-time device information.

Example 16 includes the subject matter of example 15, wherein obtaining real-time device information comprises: obtaining device information from a device passively monitoring network flow.

Example 17 is a firewall apparatus comprising means to perform a method as described in examples 11-16.

Example 18 is a firewall comprising: a network interface; a rules engine, coupled to the network interface, comprising: a rule evaluator module, configured to evaluate rules that include dynamic objects; a dynamic object evaluator module, configured to evaluate a dynamic object for use by the rule evaluator module; a real-time data collector, configured to obtain data from a real-time data source; a non-real time data collector, configured to obtain data from a non-real time data inventory; and a dynamic object creator module, configured to create and populate a dynamic object with one or more of real-time data and non-real time data; and a rules data store, coupled to the rules engine.

Example 19 includes the subject matter of example 18, further comprising: a user interface, comprising: a dynamic object definer, configured to define dynamic objects for use with a firewall rule.

Example 20 includes the subject matter of examples 18-19, wherein the dynamic object comprises one or more conditions associated with real-time data or non-real time data.

Example 21 includes the subject matter of examples 18-19, wherein the dynamic object creator module stores dynamic objects in the rules data store.

Example 22 includes the subject matter of example 18, further comprising: a user interface, comprising: a dynamic object definer, configured to define dynamic objects for use with a firewall rule, wherein the dynamic object comprises one or more conditions associated with real-time data or non-real time data, and wherein the dynamic object creator module stores dynamic objects in the rules data store.

Example 23 is a system for protecting a network with a firewall, comprising: a real-time source of network device data; a non-real time source of network device data; a firewall, comprising: a processor; a firewall rules data store, coupled to the processor; and a memory, coupled to the processor, on which are stored instructions that when executed cause the processor to: create a dynamic object for use in a firewall rule, the dynamic object defining a variable group of devices; populate the dynamic object from data received from one or more of the real-time source of network device data and the non-real time source of network device data; and evaluate the dynamic object as part of evaluating the firewall rule employing the dynamic object.

Example 24 includes the subject matter of example 23, wherein the real-time source of network device data comprises a network security device passively monitoring a network.

Example 25 includes the subject matter of example 23, wherein the non-real time source of network device data comprises a mobile security manager for endpoint devices.

Example 26 includes the subject matter of example 23, wherein the non-real time source of network device data comprises a logon collector for a directory service.

Example 27 includes the subject matter of examples 23-26, wherein instructions stored on the memory further comprise instructions that when executed cause the processor to: provide a user interface for defining dynamic objects and defining rules that employ dynamic objects.

Example 28 includes the subject matter of examples 23-26, wherein the instructions that when executed cause the processor to populate the dynamic object comprise instructions that when executed cause the processor to: synchronize the dynamic object with the non-real time source of data.

Example 29 is a firewall device, comprising: means for creating a dynamic object for use in a firewall rule, the dynamic object defining a variable group of devices; means for populating the dynamic object from data received from sources external to the firewall; and means for evaluating the dynamic object as part of evaluating the firewall rule.

Example 30 includes the subject matter of example 29, wherein the means for populating the dynamic object comprises: means for receiving device data from a real-time data source; and means for populating the dynamic object with the received device data.

Example 31 includes the subject matter of example 30, wherein the means for receiving device data from a real-time data source comprises: means for requesting device data from a network security device monitoring a network.

Example 32 includes the subject matter of example 29, wherein the means for populating the dynamic object comprises: means for receiving device data from a non-real time data inventory; and means for populating the dynamic object with the received device data.

Example 33 includes the subject matter of example 29, wherein the means for receiving device data from a non-real time data inventory comprises: means for synchronizing the dynamic object with the non-real time data inventory.

Example 34 includes the subject matter of example 29, wherein the means for receiving device data from a non-real time data inventory comprises: means for querying the non-real time data inventory for device information.

Example 35 includes the subject matter of examples 29-34, further comprising: means for providing a user interface for defining dynamic objects and defining rules that employ dynamic objects.

Example 36 includes the subject matter of example 29, wherein the dynamic object evaluates to a variable set of devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A machine readable storage device or storage disk comprising instructions that, when executed, cause a firewall device to at least:
   create a dynamic object for a firewall rule, the dynamic object to define a variable set of devices that satisfy a plurality of conditions included in the dynamic object, the dynamic object to be created by:
      accessing device data from a real-time data source external to the firewall device;
      analyzing the device data from the real-time data source to determine information identifying a first set of devices that satisfy a first one of the plurality of conditions included in the dynamic object; and
      populating the dynamic object with the information identifying the first set of devices that satisfy the first one of the plurality of conditions;
   evaluate the dynamic object for a first device associated with first network traffic to determine whether to apply the firewall rule to the first network traffic, the dynamic object to be evaluated for the first device based on the information populated in the dynamic object;and
   when the firewall rule is to apply to the first network traffic, at least one of block, permit, rate limit, quarantine or capture the first network traffic in accordance with the firewall rule.

2. The machine readable storage device or storage disk of claim 1, wherein the instructions, when executed, cause the firewall device to request the device data from a network security device monitoring a network.

3. The machine readable storage device or storage disk of claim 1, wherein the instructions, when executed, cause the firewall device to:

access second device data from a non-real time data inventory; and populate the dynamic object based on the received device data.

4. The machine readable storage device or storage disk of claim 3, wherein the instructions, when executed, cause the firewall device to:

synchronize the dynamic object with the non-real time data inventory.

5. The machine readable storage device or storage disk of claim 3, wherein the instructions, when executed, cause the firewall device to:

query the non-real time data inventory for the second device data.

6. The machine readable storage device or storage disk of claim 1, wherein the instructions, when executed, cause the firewall device to:

provide a user interface to define dynamic objects and to define rules that employ the dynamic objects.

7. The machine readable storage device or storage disk of claim 1, wherein the dynamic object is to evaluate to the variable set of devices.

8. A method to provide a firewall for a network, the method comprising:

defining, by executing an instruction with a processor, a firewall rule that employs a dynamic object, the dynamic object to define a variable set of devices that satisfy a plurality of conditions included in the dynamic object;

creating the dynamic object by:
accessing device data from a real-time data source;
analyzing the device data from the real-time data source to determine information identifying a first set of devices that satisfy a first one of the plurality of conditions included in the dynamic object; and
populating the dynamic object with the information identifying the first set of devices that satisfy the first one of the plurality of conditions;

matching, by executing an instruction with the processor, a first device corresponding to first network traffic against the information populated in the dynamic object to determine whether to apply the firewall rule to the first network traffic; and when the firewall rule is to apply to the first network traffic, at least one of blocking, permitting, rate limiting, quarantining or capturing the first network traffic in accordance with the firewall rule.

9. The method of claim 8, further including:
synchronizing the dynamic object with a non-real time data inventory of device data.

10. The method of claim 9, wherein the synchronizing of the dynamic object with the non-real time data inventory of device data includes:
querying the non-real time data inventory; and
updating the dynamic object with results obtained by querying the non-real time data inventory.

11. The method of claim 8, further including:
obtaining real-time device information; and
populating the dynamic object based on the real-time device information.

12. The method of claim 11, wherein the obtaining of the real-time device information includes:
obtaining the real-time device information from a device passively monitoring network flow.

13. A firewall apparatus comprising:
a network interface;
a rule evaluator to evaluate firewall rules that include dynamic objects to determine whether to apply the firewall rules to first network traffic associated with a first device, the firewall apparatus to at least one of block, permit, rate limit, quarantine or capture the first network traffic in accordance with the firewall rules when the firewall rules are to apply to the first network traffic;
a dynamic object evaluator to evaluate a first one of the dynamic objects to determine whether the firewall rules apply to the first network traffic, the first one of the dynamic objects to define a variable set of devices that satisfy a plurality of conditions included in the dynamic object;
a real-time data collector to obtain data from a real-time data source;
a non-real time data collector to obtain data from a non-real time data inventory;
a dynamic object creator to create and populate the first one of the dynamic objects based on one or more of the real-time data or the non-real time data by:
analyzing the data from the real-time data source to determine information identifying a first set of devices that satisfy a first one of the plurality of conditions included in the first one of the dynamic objects; and
populating the dynamic object with the information identifying the first set of devices that satisfy the first one of the plurality of conditions; and
a rules data store, at least one of the rule evaluator, the dynamic object evaluator, the real-time data collector, the non-real time data collector, or the dynamic object creator implemented by a logic circuit.

14. The firewall apparatus of claim 13, further including:
a dynamic object definer to define the dynamic objects included in the firewall rules.

15. The firewall apparatus of claim 13, wherein the dynamic object creator is to store the dynamic objects in the rules data store.

16. A system to protect a network with a firewall, comprising:
a real-time source of network device data;
a non-real time source of network device data;
a firewall including:
a processor;
a firewall rules data store in communication with the processor; and
memory in communication with the processor, the memory including instructions that, when executed, cause the processor to at least:
create a dynamic object for a firewall rule, the dynamic object to define a variable set of devices that satisfy a plurality of conditions included in the dynamic object, the processor to create the dynamic object by:
analyzing device data from a real-time source of network device data to determine information identifying a first set of devices that satisfy a first one of the plurality of conditions included in the dynamic object; and
populating the dynamic object with the information identifying the first set of devices that satisfy the first one of the plurality of conditions;

evaluate the dynamic object for a first device associated with first network traffic to determine whether to apply the firewall rule to the first network traffic, the dynamic object to be evaluated for the first device based on the information populated in the dynamic object; and when the firewall rule is to apply to the first network traffic, cause the firewall to at least one of block, permit, rate limit, quarantine or capture the first network traffic in accordance with the firewall rule.

17. The system of claim 16, wherein the real-time source of network device data includes a network security device passively monitoring a network.

18. The system of claim 16, wherein the processor is further to populate the dynamic object based on a non-real time source of network device data including a mobile security manager for endpoint devices.

19. The system of claim 16, wherein the processor is further to populate the dynamic object based on a non-real time source of network device data including a logon collector for a directory service.

20. The system of claim 16, wherein the processor is to:
provide a user interface to define the dynamic object and to define the firewall rule that includes the dynamic object.

21. The system of claim 16, wherein the processor to is:
synchronize the dynamic object with a non-real time source of network device data.

* * * * *